(12) United States Patent
Kondo et al.

(10) Patent No.: US 8,469,370 B2
(45) Date of Patent: Jun. 25, 2013

(54) SUSPENSION DEVICE

(75) Inventors: Takuhiro Kondo, Tokyo (JP); Mitsuhiko Hirose, Tokyo (JP); Takayuki Tachi, Toyota (JP); Yasutaka Fukumoto, Toyota (JP); Motohiko Honma, Toyota (JP)

(73) Assignees: Kayaba Industry Co., Ltd, Minato-ku (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/388,805

(22) PCT Filed: Oct. 1, 2009

(86) PCT No.: PCT/JP2009/067526
§ 371 (c)(1),
(2), (4) Date: Apr. 4, 2012

(87) PCT Pub. No.: WO2011/016147
PCT Pub. Date: Feb. 10, 2011

(65) Prior Publication Data
US 2012/0181767 A1    Jul. 19, 2012

(30) Foreign Application Priority Data

Aug. 5, 2009   (JP) ................................. 2009-182083

(51) Int. Cl.
*B60G 17/04*    (2006.01)
(52) U.S. Cl.
USPC .............. 280/5.514; 280/124.154; 188/299.1; 267/64.21

(58) Field of Classification Search
USPC ................... 280/124.154, 5.514; 188/299.1, 188/266.3; 267/64.21
See application file for complete search history.

(56) References Cited

U.S. PATENT DOCUMENTS

| | | | | |
|---|---|---|---|---|
| 5,060,959 A | * | 10/1991 | Davis et al. | 280/5.514 |
| 5,716,140 A | | 2/1998 | Kondo et al. | |
| 6,332,624 B1 | * | 12/2001 | Gilsdorf et al. | 280/124.16 |
| 6,676,119 B2 | * | 1/2004 | Becker et al. | 267/218 |
| 6,783,121 B2 | * | 8/2004 | Bank et al. | 267/64.21 |
| 6,857,625 B2 | * | 2/2005 | Loser et al. | 267/175 |
| 7,135,794 B2 | * | 11/2006 | Kuhnel | 310/80 |
| 7,469,910 B2 | * | 12/2008 | Munster et al. | 280/5.514 |

(Continued)

FOREIGN PATENT DOCUMENTS

| | | |
|---|---|---|
| JP | 7-317760 A | 12/1995 |
| JP | H08-197931 | 8/1996 |

(Continued)

*Primary Examiner* — Nicole Verley
(74) *Attorney, Agent, or Firm* — McGlew and Tuttle, P.C.

(57) ABSTRACT

A suspension device (S) of the present invention includes: a member (11) coupled to one of a vehicle body and a vehicle axle; an outer cylinder (3) coupled to the other one of the vehicle body and the vehicle axle and disposed at the outer circumference of the member (11); and a bearing (4) that is interposed between the member (11) and the outer cylinder (3), the bearing (4) having balls (4*a*) that rollably contact at least one of the member (11) and the outer cylinder (3), and a ball case (4*b*) that retains the balls (4*a*) rollably.

4 Claims, 3 Drawing Sheets

U.S. PATENT DOCUMENTS

| | | | |
|---|---|---|---|
| 7,644,935 B2 * | 1/2010 | Munster et al. | 280/5.514 |
| 7,722,056 B2 * | 5/2010 | Inoue et al. | 280/5.512 |
| 7,874,561 B2 * | 1/2011 | Michel | 280/6.157 |
| 7,959,135 B2 * | 6/2011 | Voelkel | 267/64.21 |
| 8,042,658 B2 * | 10/2011 | Kondo et al. | 188/267 |
| 8,109,371 B2 * | 2/2012 | Kondo et al. | 188/266.3 |
| 8,205,864 B2 * | 6/2012 | Michel | 267/218 |
| 8,262,100 B2 * | 9/2012 | Thomas | 280/5.514 |
| 2006/0163863 A1 * | 7/2006 | Ellmann et al. | 280/788 |
| 2012/0187640 A1 * | 7/2012 | Kondo et al. | 280/5.514 |

FOREIGN PATENT DOCUMENTS

| | | |
|---|---|---|
| JP | 2004-204994 A | 7/2004 |
| JP | 2006-10029 A | 1/2006 |
| JP | 2006-153153 A | 6/2006 |
| JP | 2008-95798 A | 4/2008 |
| JP | 2008-222112 A | 9/2008 |
| JP | 2009-120010 A | 6/2009 |

* cited by examiner

SUSPENSION DEVICE

FIELD OF THE INVENTION

The present invention relates to an improvement in a suspension device that suppresses relative movement between a vehicle body and vehicle axle using the electromagnetic force generated in a motor.

DESCRIPTION OF THE RELATED ART

As this type of suspension device, Japanese Patent Application Laid-Open No. H08-197931 discloses, for example, a device that is configured by a suspension spring elastically supporting a vehicle body, i.e. spring upper member of a vehicle; an actuator including a threaded shaft rotatably threaded to a ball screw nut coupled to a vehicle axle, i.e. spring lower member, and a motor that is coupled to one end of the threaded shaft and is elastically supported to the spring upper member by being interposed between a pair of springs; and a hydraulic damper fixed to the spring upper member and dampening oscillations in the vertical direction of the actuator, and this device carries out active control of the relative movement between the vehicle body and vehicle axle with the thrust force of the actuator.

In addition, in the case of this suspension device, a motion conversion mechanism is provided that is configured by the threaded shaft and the ball screw nut converting the torque of a motor, which is a damping force source, into a damping force to act in a linear direction, and thus the inertial mass of the rotating system is great, and together with the friction of the rotating system, it becomes difficult for the motor and motion conversion mechanism to perform the extension-retraction operation during the input of high frequency oscillations; therefore, it is configured so as to absorb the high frequency oscillations with the above hydraulic damper and pair of springs.

DISCLOSURE OF THE INVENTION

However, this suspension device interposes an annular bearing in two parts between an outer cylinder for guiding linear motion of a motor and covering the motor, and the motor; therefore, even when attempting to absorb high frequency oscillations with the springs sandwiching the hydraulic damper and motor, it becomes difficult for the hydraulic damper to work due to the presence of the above-mentioned bearing, which hinders the oscillation absorbance, whereby vehicle ride quality may deteriorate from the oscillations transmitted to the spring upper member.

Furthermore, in this suspension device, forces from a lateral direction may be input due to changes in the geometry while the vehicle is travelling or the like, and since a structure is made that receives this force at the threaded region of the threaded shaft and the ball screw nut, this force being loaded on the grooves of the threaded shaft and the balls of the ball screw nut travelling in the groove, there is a possibility that deterioration of the threaded shaft and ball screw nut, which are members forming the foundation for the suspension device, will be accelerated.

Additionally, since the above-mentioned bearing hinders the vertical movement of the motor, it results in a great acceleration tending to act on the actuator. Further, during the input of a high frequency oscillation, the respective parts of the actuator is vibrated directly by the high frequency oscillation, and thus the high frequency oscillation has a great acceleration, leading to there being a problem in the aspect of the reliability of the shock damper.

Therefore, the present invention has been conceived taking the above-mentioned deficiencies into account, and sets as an object thereof to provide a suspension device that allows deterioration to be suppressed and improves the reliability as well as the vehicle ride quality.

In order to achieve the above objects, a suspension device of the present invention includes: a member coupled to one of a vehicle body and a vehicle axle; an outer cylinder coupled to the other one of the vehicle body and the vehicle axle, and disposed at an outer circumference of the member; and a bearing interposed between the member and the outer cylinder, in which the bearing includes a ball rollably contacting at least one of the member and the outer cylinder, and a ball case that retains the ball rollably.

In addition, in order to achieve the above objects, another suspension device of the present invention includes: an actuator that includes a motion conversion mechanism converting linear motion into rotational motion and a motor coupled to a rotational member of the motion conversion mechanism exhibiting rotational motion; and a fluid pressure damper having a rod and a damper main body into which the rod moves in and out, one of the rod and the damper main body of the fluid pressure damper being coupled to a linear motion member of the motion conversion mechanism exhibiting linear motion, in which an outer cylinder is provided to one of the fluid pressure damper and the actuator, and in which a bearing is interposed between the outer cylinder and the other one of the actuator and the fluid pressure damper, the bearing having a plurality of balls rollably contacting at least one of the outer cylinder and the other one of the actuator and the fluid pressure damper, and a ball case that retains the balls rollably.

According to the suspension device of the present invention, with the bearing interposed between a member coupled to one of the vehicle body and the vehicle axle, and an outer cylinder coupled to the other one of the vehicle body and the vehicle axle and arranged at the outer circumference of the member, smooth uninterrupted extension-retraction operation is ensured with the bearing generating substantially no friction force to resist against the extension-retraction of the suspension device, and additionally, lateral force does not act on the motion conversion mechanism; therefore, the motion conversion mechanism is protected and deterioration is suppressed, whereby smooth motion conversion is maintained over a long period of time.

More specifically, since the bearing is interposed between the outer cylinder, which is provided to one of the actuator and the fluid pressure damper, and the other one of the actuator and the fluid pressure damper, smooth uninterrupted extension-retraction operation is ensured with the bearing generating substantially no friction force to resist against the extension and retraction of both the actuator and the fluid pressure damper, and additionally, the lateral force does not act on the motion conversion mechanism; therefore, the motion conversion mechanism is protected and deterioration is suppressed, whereby smooth motion conversion is maintained over a long period of time.

In addition, although the bearing receives lateral force, it does not affect the extension and retraction of the fluid pressure damper, and the smooth extension and retraction of the fluid pressure damper is ensured; therefore, this suspension device can reliably absorb high frequency oscillations input, can improve vibration isolation properties of the body, and can improve the vehicle ride quality.

Furthermore, since the bearing does not obstruct the extension and retraction of the fluid pressure damper in response to input of high frequency oscillations, a direct shocking force can be suppressed from acting on the actuator to protect the motor and the motion conversion mechanism, whereby the reliability of the actuator, which is an essential component of the suspension device, improves, and the reliability of the suspension device can be improved by resolving the shortcoming of a conventional suspension device.

DETAILED DESCRIPTION OF THE INVENTION

Figure 1:
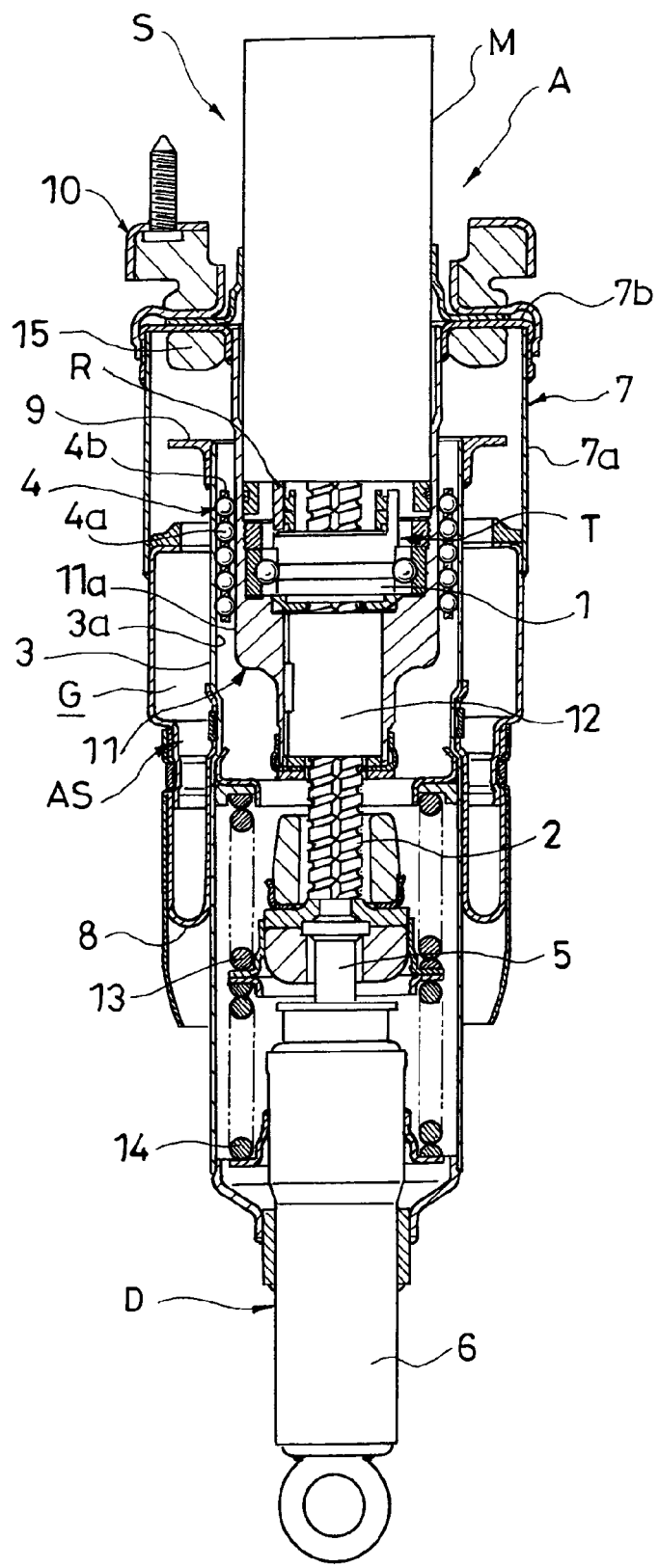
FIG. 1 is a longitudinal cross-sectional view of a suspension device according to one embodiment.

Hereinafter, the present invention will be explained based on the embodiments illustrated in the drawings. As shown in FIG. 1, a suspension device S according to one embodiment includes: an actuator A equipped with a motion conversion mechanism T that converts linear motion into rotational motion, and a motor M that is coupled to a ball screw nut 1 serving as a rotational member that exhibits the rotational motion of the motion conversion mechanism T; a fluid pressure damper D having a rod 5 and a damper main body 6 into which the rod 5 moves in and out; an outer cylinder 3 that is provided to the damper main body 6 and is disposed at the outer circumference of the actuator A; and a bearing 4 interposed between the outer cylinder 3 and the actuator A; the device being configured to connect a threaded shaft 2 serving as a linear motion member that exhibits the linear motion of the motion conversion mechanism T to the rod 5 of the fluid pressure damper D.

In addition, in the case of the present embodiment, this suspension device S includes, on an outer circumferential side, an air spring AS that functions as a suspension spring using an air chamber G defined by an annular air chamber member 7 coupled to the actuator A, the outer cylinder 3 that functions as an air piston provided to the outer circumference of the fluid pressure damper D, and a cylindrical diaphragm 8 bridged between the air chamber member 7 and the outer cylinder 3.

Then, this suspension device S is configured so as to be interposed between the body and axle of a vehicle by coupling the actuator A to the body of the vehicle at a mount 10, and coupling the damper main body 6 that is a lower end of the fluid pressure damper D to the axle of the vehicle. In other words, upon interposing between the body and axle of a vehicle, which is not illustrated, this suspension device S is basically configured so as to be interposed so that the actuator A is coupled to the vehicle body and the fluid pressure damper D is coupled to the vehicle axle. More specifically, in this case, assuming that the member coupled to the vehicle body is the actuator A, the outer cylinder 3 is connected to the vehicle axle via the damper main body 6. It should be noted that, in the case of the actuator A including the motor M as described later, there is an advantage in that an input of high frequency oscillation to the motor M can be reduced by coupling the actuator A to the vehicle body side; however, it is also possible to couple the actuator A to the vehicle axle side and the outer cylinder 3 to the vehicle body side.

More precisely, the actuator A is configured to include the motor M, and the motion conversion mechanism T that converts the rotational motion of the motor M into linear motion. In this case, the motion conversion mechanism T is configured to include the ball screw nut 1 coupled to a rotor R of the motor M and a threaded shaft 2 that threads to the ball screw nut 1, and with the rotational member as the ball screw nut 1, and the linear motion member as the threaded shaft 2, it is possible to convert the rotational motion of the ball screw nut 1 into linear motion of the threaded shaft 2. In addition, it is made possible to convert the linear motion of the threaded shaft 2 into rotational motion of the ball screw nut 1.

Moreover, the ball screw nut 1 is rotatably retained to the inner circumference of a cylindrical holder 11, and the motor M is also inserted and fixed to the inside of the holder 11. Furthermore, in order to avoid the threaded shaft 2 from rotating along with the ball screw nut 1, a ball spline nut 12 is accommodated and fixed inside of this holder 11. In addition to the helical thread grooves in which the balls of the ball screw nut 1 travel, longitudinal grooves along the axial direction in which the balls of the ball spline nut 12 travel are provided to the outer circumference of the threaded shaft 2.

Therefore, the threaded shaft 2 is jammed by the ball spline nut 12 coupled unrotatably to the motor M via the holder 11, allowing only movement in the vertical direction in FIG. 1. The threaded shaft 2 can be made to drive in the vertical direction in FIG. 1 by the ball screw nut 1 being rotationally driven by the motor M, and thus the actuator A is configured so as to be able to function as a linear actuator of linear motion type. In the present embodiment, the actuator A is configured in this way by the motor M, holder 11, the ball screw nut 1 and threaded shaft 2 of the motion conversion mechanism T, and the ball spline nut 12.

It should be noted that it may be established so that the threaded shaft 2 is connected to the rotor R of the motor M as the rotational member to enable rotational driving of this, and so as to drive in the vertical direction in FIG. 1 with the ball screw nut 1 as the linear motion member. In addition, in this case, the motion conversion mechanism T is established as a feed screw mechanism configured by the threaded shaft 2 and the ball screw nut 1; however, it may be established to be configured by a mechanism such as rack and pinion or worm gear.

Moreover, the fluid pressure damper D is configured so as to realize a predetermined damping force when exhibiting an extension/retraction operation in which the rod 5 moves in and out relative to the damper main body 6, and is mainly provided with the purpose of absorbing high frequency oscillations input to the suspension device S.

It should be noted that, although the fluid pressure damper D is not illustrated in detail due to being well known, the damper main body 6 includes a cylindrical cylinder into which a piston provided at a leading end of the rod 5 is inserted slidably, and is configured by filling working fluid into two pressure chambers sectioned by the piston inside of the above-mentioned cylinder. In addition, in a case of the fluid being a liquid, if the fluid pressure damper D is established in single-rod form, a reservoir or air chamber that compensates for the volume change of the volume fraction of the rod 5 moving in and out of the inside of the cylinder is included in the damper main body 6. It should be noted that, in addition to a liquid such as a working oil or water, or an aqueous solution, the working fluid of the fluid pressure damper D may be a gas.

Then, by the above-mentioned fluid pressure damper D being coupled in series to the actuator A, which has a large moment of inertia, does not easily extend and retract in response to input of high frequency oscillations, but tends to transmit oscillations, the fluid pressure damper D is configured so as to, in response to an input of high frequency oscillation such as an oscillation having a relatively large acceleration, absorb this oscillation energy. It should be noted that coil springs 13 and 14 installed at the outer circumference of the fluid pressure damper D are provided for the purpose of causing the position of an unillustrated piston, which is slidably inserted inside of the damper main body 6 of the fluid pressure damper D and is coupled to the rod 5, to return to a predetermined neutral position, and preventing a state in which the fluid pressure damper D remains at maximum extension or maximum retraction and becomes unable to absorb high frequency oscillations, causing the vehicle ride quality to deteriorate.

The suspension device S configured in this way can cause the threaded shaft 2 to undergo linear motion in the vertical direction in FIG. 1 by rotationally driving the ball screw nut 1 with the torque generated by the motor M, as explained in the foregoing, and thus can also suppress linear motion of the threaded shaft 2 in response to input of an external force, by providing a thrust force to the threaded shaft 2 by actively causing torque to be generated in the motor M. In addition, when the threaded shaft 2 forcibly undergoes linear motion by way of an external force, the rotor R of the motor M coupled to the ball screw nut 1 exhibits rotational motion, the motor M generates torque to suppress the rotational motion of the rotor R caused by an induced electromotive force, and functions so as to suppress the linear motion of the threaded shaft 2. In other words, in the case of the motor M being forcibly driven by way of an external force, it can suppress linear motion of the threaded shaft 2 by functioning as a generator and actively generating torque to resist the external force.

Therefore, this suspension device S does not only simply generate a damping force to suppress the linear motion of the threaded shaft 2, but also functions as an actuator, and thus, when this suspension device S is used by interposing between the body and axle of a vehicle, it is possible to simultaneously perform attitude control of the body of the vehicle, whereby it is possible to function as an active suspension.

It should be noted that, in the case of the present embodiment, the motion conversion mechanism T is configured so as to reversibly convert between rotational motion and linear motion; however, in a case that it is only necessary for the actuator A to function just as an actuator, it may be a mechanism that performs irreversible motion conversion, converting rotational motion to linear motion, but not converting linear motion to rotational motion. In this case, since the suspension device S simply functions as an active suspension without requiring the motor M to also function as a generator with external forces, it may be configured in this way.

In addition, although it is configured so that the rod 5 of the fluid pressure damper D is coupled to the threaded shaft 2, as explained above, the damper main body 6 may be coupled to the threaded shaft 2, and further, in a case of the linear motion member being the ball screw nut 1, it just needs to be configured so that the ball screw nut 1 is coupled to either the rod 5 or the damper main body 6 of the fluid pressure damper D.

Then, the outer cylinder 3, which opposes the holder 11 forming an outer shell of the actuator A to make an annular gap, is provided at the outer circumference of the damper main body 6, which is the one member not coupled to the above linear motion member of the fluid pressure damper D. More specifically, the outer cylinder 3 is coupled at a lower end in FIG. 1 to a side of the damper main body 6, and includes a flange-shaped stopper 9 at an upper end. It should be noted that this stopper 9 regulates the maximum contraction length of the suspension device S by coming into contact with an annular cushion 15 provided to the outer circumference of the actuator A.

In addition, an annular air chamber member 7 is coupled to the outer circumference of the holder 11. The air chamber member 7 is configured to include a tube portion 7a established in a larger diameter than an outer diameter of the outer cylinder 3, and an annular roof portion 7b coupling the upper end of the tube portion 7a to the holder 11. The annular gap is formed between the tube portion 7a of the air chamber member 7 and the outer cylinder 3. Then, the cylindrical diaphragm 8 having flexibility is bridged between a lower end of the tube portion 7a of the air chamber member 7 and the central outer circumference of the outer cylinder 3, and an air chamber G of the air spring AS is formed at the outer circumferences of the actuator A and the fluid pressure damper D. It is configured so that gas can be supplied to the inside of this air chamber G and discharged therefrom. The height of the vehicle and the spring constant can be adjusted by regulating the air pressure inside of the air chamber G. The air spring AS is configured so as to function as a suspension spring.

It should be noted that, since the suspension spring is established as the air spring AS in the case of the present embodiment, the outer cylinder 3 is employed as an air piston; however, in the case of the suspension spring being established as a coil spring, as a matter of course, there is no necessity to have the outer cylinder 3 function as an air piston, and the air chamber member 7 and diaphragm 8 are eliminated. For example, it is only necessary to provide a spring collar to support the upper end of the coil spring at the outer circumference of the actuator A or a mount, as well as providing a spring collar to support the lower end of the coil spring at the outer cylinder 3.

In this regard, in the suspension device S of the present embodiment, a bearing 4 is interposed between the outer cylinder 3 and the outer circumference of the holder 11 serving as the outer circumference of the actuator A, so that a lateral force input from outside does not act on the ball screw nut 1 and threaded shaft 2.

More specifically, opposing bearing running surfaces 3a and 11a are provided in the holder 11 and outer cylinder 3 while forming a constant annular gap, and the bearing 4 is interposed between these bearing running surfaces 3a and 11a. In other words, this suspension device S interposes the bearing 4 between the holder 11 as a member coupled to one of the vehicle body and the vehicle axle, and the outer cylinder 3 coupled to the other one of the vehicle body and the vehicle axle.

Figure 2:
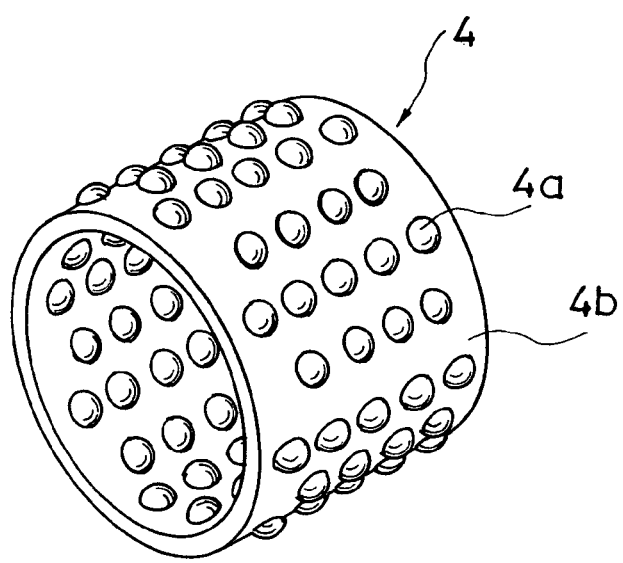
FIG. 2 is a perspective view of a bearing of the suspension device according to the embodiment.

Specifically, as shown in FIG. 1 and FIG. 2, this bearing 4 is established in ball cage form including a plurality of balls 4a interposed rollably between the outer circumference of the holder 11 serving as the outer circumference of the actuator A and the outer cylinder 3 while contacting both, and a cage 4b as a ball case that retains these balls 4a rollably. In addition, more specifically, in the case of the present embodiment, the balls 4a are aligned in the axial direction in the cage 4b of the bearing 4 to form rows, and sixteen of these ball rows are lined up in the circumferential direction. It should be noted that the installed number of balls 4a and arrangement are not limited to this.

Then, in regard to the relative movement between the outer cylinder 3 and the actuator A in the axial direction that is the vertical direction in FIG. 1, this is permitted with substantially no resistance by the balls 4a rolling between the outer circumference of the actuator A and outer cylinder 3. In regard to lateral force input to the suspension device S, this is received by the bearing 4. Therefore, the lateral force is prevented from acting on the ball screw nut 1, the threaded shaft 2 and the ball spline nut 12.

In addition, within the range in which the actuator A moves in a stroke in the axial direction relative to the outer cylinder 3, it is configured so as to always oppose the outer cylinder 3 and the actuator A in the entirety of the axial direction length of the bearing 4.

It should be noted that, although the cage 4b will move in the vertical direction from the balls 4a rolling, the lengths in the axial direction of the running surfaces 3a and 11a of the bearings 4 on the holder 11 and outer cylinder 3 are set so that the cage 4b is maintained in a state interposed between the outer circumference of the holder 11 forming an outer shell of the actuator A and the outer cylinder 3 without falling out even if the suspension device S undergoes maximum extension-retraction operations.

In other words, since the bearing 4 of the above-mentioned structure is interposed between the outer cylinder 3 provided to the fluid pressure damper D and the outer circumference of the actuator A in the suspension device S, smooth uninterrupted extension-retraction operation is ensured with the bearing 4 generating substantially no friction force to resist against the extension-retraction of both the actuator A and the fluid pressure damper D, and the lateral force does not act on the motion conversion mechanism T; therefore, the motion conversion mechanism T is protected and deterioration is suppressed, whereby smooth motion conversion is maintained over a long period of time.

In addition, although the bearing 4 receives lateral force, it does not affect the extension and retraction of the fluid pressure damper D, and the smooth extension and retraction of the fluid pressure damper D is ensured; therefore, this suspension device S can reliably absorb high frequency oscillations input, can improve vibration isolation properties of the body, and can improve the vehicle ride quality.

Furthermore, since the bearing 4 does not obstruct the extension and retraction of the fluid pressure damper D in response to input of high frequency oscillations, a shocking force can be suppressed from acting directly on the actuator A to protect the motor M and the motion conversion mechanism T, whereby the reliability of the actuator A, which is an essential component of the suspension device S, improves, and the reliability of the suspension device S can be improved by resolving the shortcoming of a conventional suspension device.

In addition, in the suspension device S of the present embodiment, the outer cylinder 3 is not installed only for the purpose of interposing the bearing 4, but rather the outer cylinder 3 serves also as an air piston configuring the air spring AS; therefore, the number of components does not increase upon the installation of the bearing 4, and it is possible to reduce weight gain for the overall suspension device S.

It should be noted that, in the above description, although it is configured so as to interpose the bearing 4 of ball cage form between the actuator A and outer cylinder 3, by providing the outer cylinder 3 opposing the outer circumference of the actuator A at the damper main body 6 of the fluid pressure damper D, a bearing of ball cage form may be interposed between the damper main body 6 and outer cylinder by providing an outer cylinder opposing the outer circumference of the damper main body 6 to the actuator A, or a bearing of ball cage form may be interposed between an outer cylinder and a cylindrical body providing an outer cylinder to the actuator A and providing the cylindrical body opposing the outer cylinder at the rod 5 of the fluid pressure damper D.

In addition, although it is configured that the bearing 4 is made to contact and travel on the holder 11 functioning as a case of the actuator A in the present embodiment, when the case of the motor M also serves as all or a portion of the case of the actuator A, it may be configured so as to allow the bearing 4 to travel on the case of the motor M.

Furthermore, as in a ball spline, it may be configured to provide a groove along the axial direction in the running surfaces 3a and 11a of the bearing 4 on the holder 11 and outer cylinder 3 so as to allow the balls 4a of the bearing 4 to travel in this groove. In addition, in the above description, the balls 4a of the bearing 4 are configured so as to be retained in the cage 4b as the ball case and to roll in the position; however, it may be configured so that the balls 4a circulate by rolling on their own.

Moreover, as described above, the bearing 4 is interposed between the outer cylinder 3 and a member opposing this, in the present embodiment, between the outer cylinder 3 and the outer circumference of the actuator A, and is established as a bearing of ball cage form made from the balls 4a rollably contacting both the outer cylinder 3 and the outer circumference of the actuator A, and the cage 4b retaining the balls 4a rollably; therefore, it is thin-walled without the necessity to circulate the balls 4a, and thus, even if interposed between the outer cylinder 3 and the member opposing this, there is the advantage in that it is possible to keep an increase in diameter of the suspension device to a minimum. In contrast, it is also possible to use a bearing in which the balls rollably contact either one of the outer cylinder 3 and member opposing this, in the present embodiment, the outer cylinder 3 and the outer circumference of the actuator A, and circulate in the ball case by rolling on their own. In this case, it is only necessary to fix the ball case to the one of the outer cylinder 3 and the member opposing this that the balls are not contacting. Even in the case of using a bearing of such a configuration, it may be configured so as to guide the travel of the balls by providing grooves in which the balls travel to one of the outer cylinder 3 and the member opposing this that the ball contacts, as in a ball spline.

Figure 3:
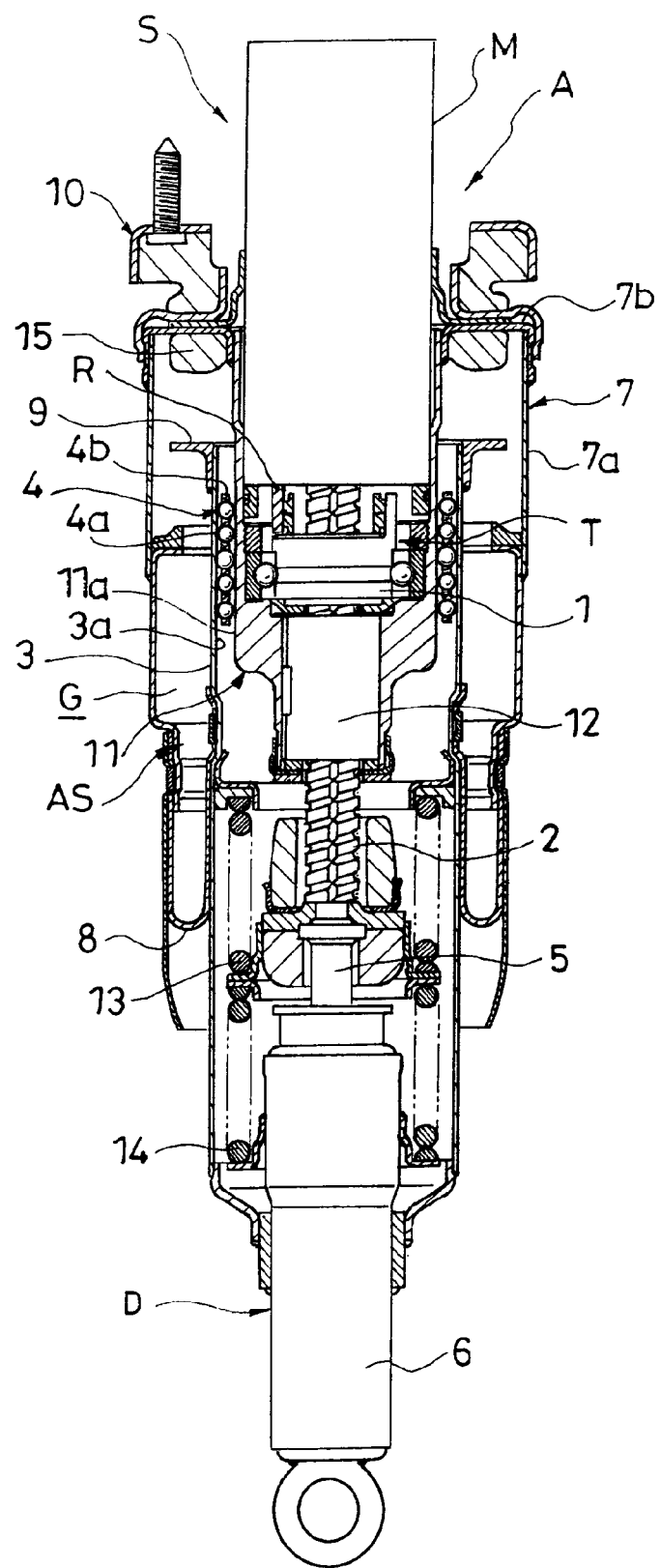
FIG. 3 is a longitudinal cross-sectional view of a suspension device according to a modified example of the embodiment.

In addition, as described above, in the case of the bearing 4 in which the balls 4a are retained in the cage 4b and roll in the position, it is configured so that the diameter of the balls 4a gets smaller the more towards both ends in the axial direction of the bearing 4, as shown in FIG. 3, that is, the diameter is smaller for balls 4a disposed at both end sides, whereby an effect equivalent to crowning treatment can be obtained, and much smoother extension and retraction of both the actuator A and fluid pressure damper D can be realized. Furthermore, when an excessive moment acts on the suspension device S due to the input of a lateral force, since the diameter of the balls 4a gets smaller the more towards both end sides, the load on each ball 4a can be equalized without excessive pressure acting on some balls 4a, and it is possible to suppress excessive pressure from acting on the balls 4a, the outer cylinder 3 and the holder 11, which is the outer shell of the actuator A and is a component coupled to one of the vehicle body and vehicle axle, and even if the outer cylinder 3 is tilted relative to the actuator A within a range in which yawing of the outer cylinder 3 is permitted relative to the actuator A while the moment is acting, resistance will not be presented to the extension and retraction of the suspension device S.

Although the explanations of the embodiments of the present invention are finished, it is a matter of course that the scope of the present invention is not to be limited to the details illustrated or explained therein.

[INDUSTRIAL APPLICABILITY]

The present invention can be applied to the suspension device of a vehicle.

The invention claimed is:

1. A suspension device, comprising:
an actuator comprising a motion conversion mechanism converting linear motion into rotational motion and a motor coupled to a rotational member of the motion conversion mechanism exhibiting rotational motion; and
a fluid pressure damper having a rod and a damper main body into which the rod moves in and out, one of the rod and the damper main body of the fluid pressure damper being coupled to a linear motion member of the motion conversion mechanism exhibiting linear motion;
an outer cylinder connected to the fluid pressure damper;
an air chamber forming an air spring sectioned by an air chamber member provided at an outer circumference of the actuator, the outer cylinder, and a diaphragm bridged between the air chamber member and the outer cylinder, wherein the outer cylinder functions as an air piston of the air spring;
a bearing interposed between the actuator and the outer cylinder, the bearing having a ball rollably contacting at least one of the actuator and the outer cylinder, and a ball case that retains the ball rollably, wherein a groove in which the ball travels is provided to one of the actuator and the outer cylinder on which the ball rolls so as to guide travel of the ball.

2. The suspension device according to claim 1, wherein the bearing includes a plurality of balls rollably interposed between the outer cylinder and the other one of the actuator and the fluid pressure damper, and a ball case that retains the balls rollably.

3. The suspension device according to claim 2, wherein diameters of the balls of the bearing are set so as to be smaller for balls disposed at both end sides in an axial direction of the bearing.

4. The suspension device according to 1, wherein diameters of the balls of the bearing are set so as to be smaller for balls disposed at both end sides in an axial direction of the bearing.

* * * * *